US012596756B2

(12) United States Patent
De Barros et al.

(10) Patent No.: US 12,596,756 B2
(45) Date of Patent: Apr. 7, 2026

(54) PERSONALIZED RELATED QUERIES FOR SEARCH SEGMENTS

(71) Applicant: Microsoft Technology Licensing, LLC, Redmond, WA (US)

(72) Inventors: Marcelo De Barros, Redmond, WA (US); Prithvishankar Srinivasan, Seattle, WA (US); Aman Singhal, Bellevue, WA (US); Manish Mittal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 53 days.

(21) Appl. No.: 16/552,867

(22) Filed: Aug. 27, 2019

(65) Prior Publication Data
US 2021/0064678 A1      Mar. 4, 2021

(51) Int. Cl.
*G06F 16/9535* (2019.01)
*G06F 16/9532* (2019.01)
(Continued)

(52) U.S. Cl.
CPC ...... *G06F 16/9535* (2019.01); *G06F 16/9532* (2019.01); *G06F 16/9537* (2019.01); *G06F 16/9538* (2019.01)

(58) Field of Classification Search
CPC ............. G06F 16/9535; G06F 16/9532; G06F 16/9537; G06F 16/9538
See application file for complete search history.

(56) References Cited

U.S. PATENT DOCUMENTS 8,468,143 B1 * 6/2013 Oztekin ............ G06F 16/90335
707/706
11,055,305 B1 * 7/2021 Petricek ................ G06F 16/252
(Continued)

FOREIGN PATENT DOCUMENTS

CN        102193973 A      9/2011
CN        102576368 A      7/2012

OTHER PUBLICATIONS

"International Search Report and Written Opinion Issued in PCT Application No. PCT/US20/037353", Mailed Date: Aug. 31, 2020, 12 Pages.
(Continued)

*Primary Examiner* — Kannan Shanmugasundaram
(74) *Attorney, Agent, or Firm* — CALFEE, HALTER & GRISWOLD LLP

(57) ABSTRACT

Mechanisms to personalize quick answers to a user are described. A query history is assembled from queries previously submitted by users. Each entry in the query history comprises a query, an associated quick answer, and the userID associated with the user that submitted the query. A query database is created by submitting the query of each query entry in the query history to a trained machine learning classifier to classify the query with an associated quick answer segment. The quick answer segment is combined with the other information in the query history to create an entry into a query database. When a current query is received from a user, the query database is searched and prior queries with the same quick answer segment from the same user are extracted. A subset of the resultant queries are combined with a subset of queries from other users to personalize the search results.

20 Claims, 7 Drawing Sheets

(51) Int. Cl.
*G06F 16/9537* (2019.01)
*G06F 16/9538* (2019.01)

(56) References Cited

U.S. PATENT DOCUMENTS

| | | | | | |
|---|---|---|---|---|---|
| 2004/0249808 | A1* | 12/2004 | Azzam | ................. | G06F 16/3325 |
| | | | | | 707/999.004 |
| 2008/0082485 | A1 | 4/2008 | Church | | |
| 2009/0313237 | A1 | 12/2009 | Agrawal et al. | | |
| 2010/0287170 | A1 | 11/2010 | Liu et al. | | |
| 2011/0055189 | A1* | 3/2011 | Effrat | .................. | G06F 16/9535 |
| | | | | | 707/706 |
| 2012/0005219 | A1 | 1/2012 | Apacible et al. | | |
| 2014/0108446 | A1* | 4/2014 | Djabarov | ............ | G06F 16/3325 |
| | | | | | 707/768 |
| 2015/0199436 | A1 | 7/2015 | Bailey et al. | | |
| 2016/0098477 | A1 | 4/2016 | Berajawala | | |
| 2016/0132773 | A1 | 5/2016 | Chandrasekaran et al. | | |
| 2021/0064678 | A1 | 3/2021 | De Barros et al. | | |

OTHER PUBLICATIONS

Secrist, Greg, "The Google Quick Answer Box: What, Why and How?", Retrieved From https://www.bkacontent.com/the-google-quick-answer-box-what-why-and-how/, Dec. 7, 2015, 8 Pages.

Examination Report Received for Indian Application No. 202147062216, mailed on Mar. 4, 2025, 07 Pages.

First Office Action Received for Chinese Application No. 202080060469.8, mailed on Oct. 31, 2024, 16 pages. (English Translation Provided).

Notice of Grant Received for Chinese Application No. 202080060469.8, mailed on Jul. 24, 2025, 07 pages. (English Translation Provided).

Second Office Action Received for Chinese Application No. 202080060469.8, mailed on May 6, 2025, 15 pages. (English Translation Provided).

Communication pursuant to Article 94(3) EPC, Received in European Patent Application No. 20753273.0, mailed on Sep. 26, 2025, 07 pages.

\* cited by examiner

PERSONALIZED RELATED QUERIES FOR SEARCH SEGMENTS

FIELD

This application relates generally to personalized search. More specifically, this application relates to improvements in search services and in presenting a personalized search experience for quick answers in a search service.

BACKGROUND

When internet search services were first developed, a results page consisted of a list of "blue links" that, when activated by a user, would take the user to a website that presumably was related to an entered search query. As search services have become more sophisticated, user's expectations have increased. Currently a user expects to enter a query such as "how tall is mount Everest" and receive an immediate answer rather than being shown a list of blue links where a user may find the answer to the query. These so called quick answers have improved a user's search experience, allowing a user to find answers without the trouble of going to multiple web sites looking for the answer to their query.

It is within this context that the present embodiments arise.

DETAILED DESCRIPTION

Figure 1:
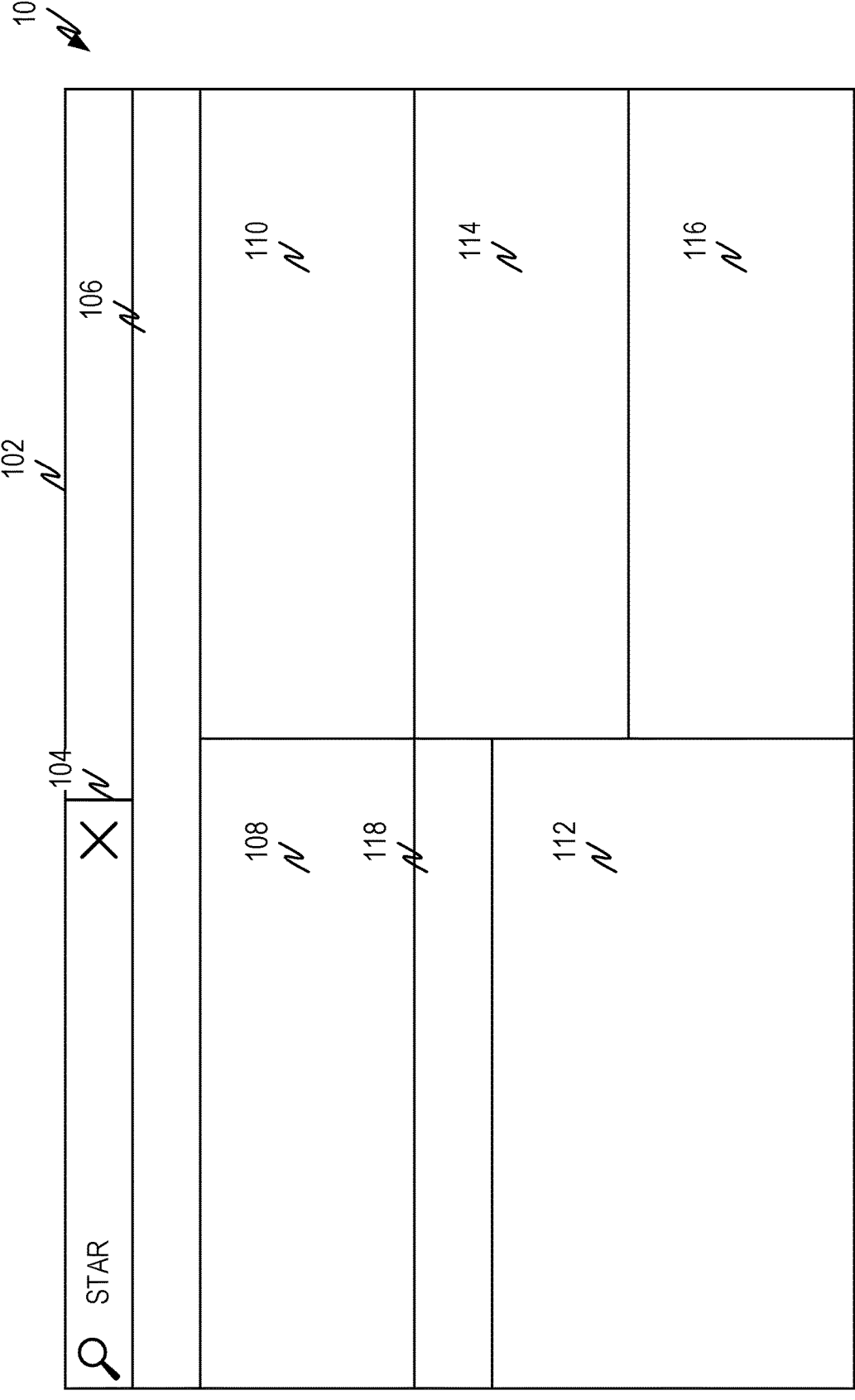
FIG. 1 illustrates an example user interface showing personalized search queries for quick answers according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Internet search engines today provide one or more quick answers where the user's submitted query is amenable to a quick answer. Thus, if a user submits the query "how high is mount Everest" the search engine presents the quick answer informing the user that mount Everest is 29,029 ft or 8,848 m high. The quick answers provided by internet search engines typically fall into a quick answer segment, sometimes referred to herein as simply a segment. Segments are like a category for the quick answer. Examples of segments include, but are not limited to, health, politics, news, finance, sports, esports, and so forth.

Some search engines classify search results into "verticals," which are similar to, but separate from, segments in at least two ways. First, verticals include search results while segments are reserved for quick answers. Additionally, verticals typically are fixed categories for search results, while segments tend to be more fluid and dynamic so that the segments that exist in a search engine can change from time to time.

When a user submits a current query that produces one or more quick answers, embodiments of the present disclosure present a set of personalized query suggestions in conjunction with the quick answers. The set of personalized query suggestions can comprise queries previously submitted by a user as well as queries submitted by other users that meet certain criteria, such as trending queries that are related to and/or relevant to the current query.

In one example embodiment, queries for a period of time are analyzed and used to create a query database. Entries in the query database each comprise a set of data that allows prior queries submitted by one or more users and that relate to a given segment to be extracted. Thus, when the current query is submitted, the segment associated with the current query is identified. The segment is used to extract prior queries submitted by the user. The queries can be ranked and a subset of the ranked queries selected based on a selection criteria. The selected subset can be presented in proximity to the quick answers associated with the current query.

Additionally, or alternatively, queries from other users can be presented. These queries may produce quick answers or may be of a type that do not produce quick answers. In one aspect, queries from others that produce one or more results that are the same as results produced by the current query can be identified, ranked, and a subset selected for presentation to the user. In another aspect, queries from others that produce quick answers in the same segment as the current query can be identified, ranked, and a subset selected for presentation to the user. In still another aspect, a combination thereof can be identified, ranked, and a subset selected for presentation to the user.

User interaction with and/or engagement with presented queries can be used as part of a feedback loop to adjust ranking and selection of queries, either those of the user or those of other users. For example, when the user interacts with one of the presented query suggestions, the system can make it more likely that that query will be suggested again in the future. Additionally, or alternatively, when the user does not interact with one of the presented query suggestions, the system can make it more likely that the query will not be suggested again in the future.

Description

FIG. 1 illustrates an example 100 user interface 102 showing personalized search queries for quick answers according to some aspects of the present disclosure. The user interface 102 comprises a search bar 104 where users can enter a query. In other aspects, the user interface comprises one or more additional areas (106, 108, 118, 110, 112, 114, 116) which can appear alone or in any combination. Furthermore, the arrangement of the areas can change in location from embodiment to embodiment. Thus, area 110 may appear on the left side of the screen instead of the right or in a different vertical position relative to other areas that are displayed. Finally, the areas can be a different size or shape than those depicted in user interface 102. The areas that are displayed are those that together make up the search results page that is displayed in response to a submitted query.

Area 106 displays additional controls that can be activated by the user to adjust what is seen in the search results and/or adjust settings or invoke tools available to the user. For example, a series of verticals can be displayed which, when activated, limit query results to those in a particular vertical. Activation of a particular vertical can often cause a resubmission of the query and the desired vertical to the search engine. Example verticals can include, but are not limited to images, videos, maps, news, shopping, finance, and so forth.

Area 108 displays one or more quick answers responsive to the submitted query. Area 118 displays a set of personalized query suggestions and/or related queries that are identified according to the mechanisms described herein. In this application query suggestions and related queries will be treated the same and no distinction is made herein.

Area 112 comprises the main body of search results responsive to the query. These are the "blue links" and other information of search results.

Additionally, or alternatively, the results page can comprise one or more additional areas 110, 114, 116. These can be different "panes" that can display additional information related to the query. For example, one such area may display focus information related to the query in a manner that makes it easy for the user to consume. For example, if a user submits the query "MLB standings," the quick answer pane 102 can display the standings of the different Major League Baseball teams according to their league and their division along with key statistics. The area 110 may then be used to display summary information about the current Major League Baseball season, highlight different players, and so forth. As another example, searching for a stock symbol can result in key stock price information being displayed in the quick answer area 108, while one or more of the additional areas 110, 114, and/or 116 can be used to display additional information about the company corresponding to the stock price.

Until now, however, no search engine displays in a results page a set of personalized query suggestions (e.g., in area 118) that comprise suggestions such as prior queries submitted by the user and/or additional queries submitted by other users that are related to the query that produced the quick answer. Embodiments of the present disclosure identify personalized query suggestions and display them in proximity to the quick answer(s) produced by a user query.

Figure 2:
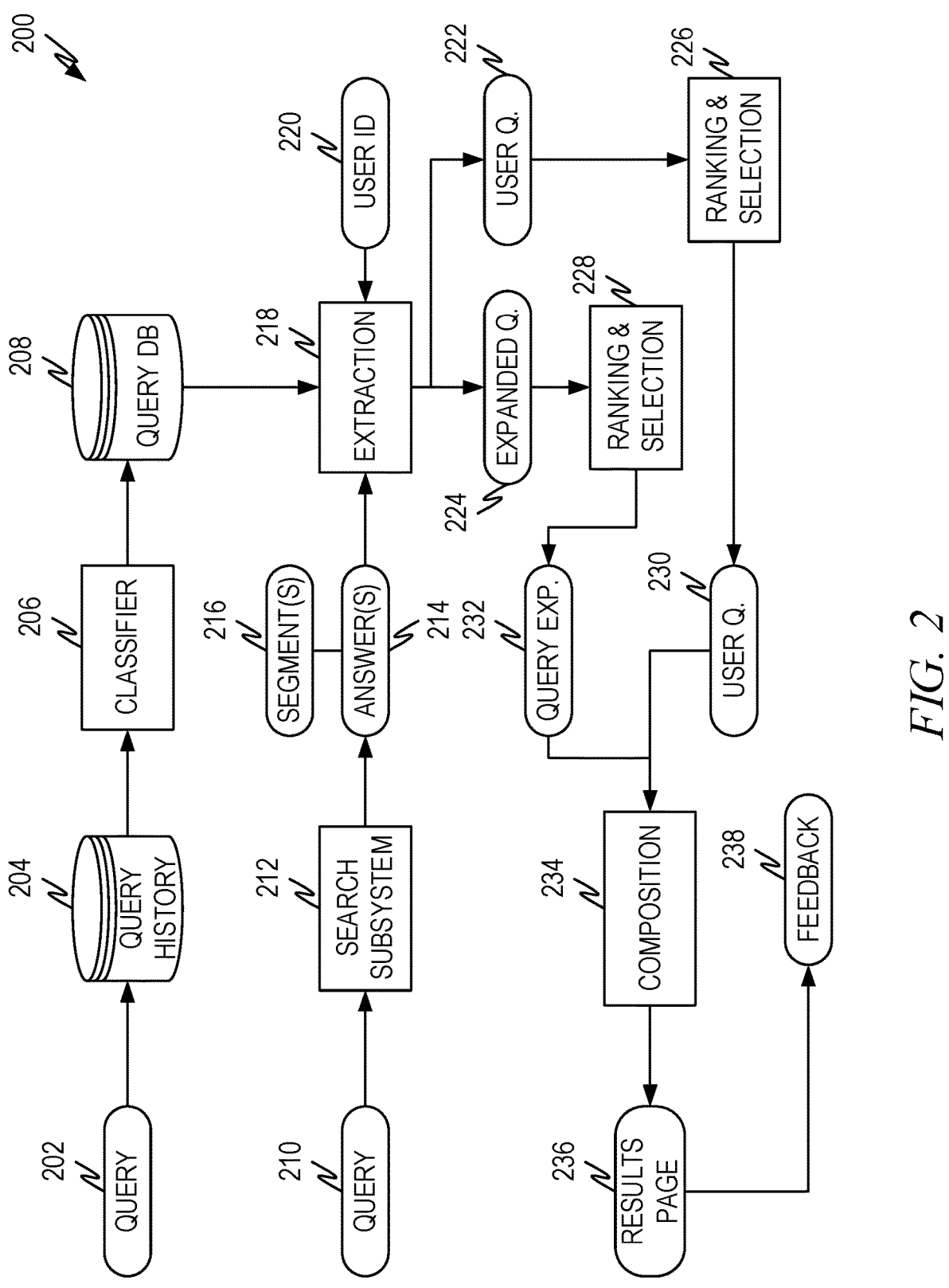
FIG. 2 illustrates an example architecture according to some aspects of the present disclosure.

FIG. 2 illustrates an example architecture 200 according to some aspects of the present disclosure. This architecture produces personalized query suggestions for quick answers as illustrated in FIG. 1. The architecture comprises an offline process and a process executed in response to a submitted user query. In this context, "offline" means prior to receiving a user query for which personalized suggestions are identified and displayed.

The offline process begins by assembling a query history 204 from queries 202 submitted by a plurality of users. As explained in greater detail below, the query history can comprise user identifiers (user IDs) that identify a user that submits the query 202. The query history 204 can comprise queries from various users over a designated period of time. In one representative embodiment, the designated period of time is about 6 months. In this context about 6 months means that the period is 6 months within a week or two over or under the 6 month period. In other words, it need not be exactly 6 months to the day but may be within a plus or minus two week period from the 6 month date. In other embodiments, other time periods can be used. The only requirement is that sufficient queries exist that allow the selection and ranking process to proceed as discussed herein. Ultimately, the number of personalized query suggestions presented to the user are few in number (generally somewhere between one and ten), so the total number of source queries 202 need not be large.

Each entry in the query history 204 is presented to a trained machine learning classifier 206. The purpose of the classifier 206 is to identify which quick answer segment a query belongs to. The problem the classifier solves is given a query and/or answers/results of the query, what quick answer segment does the query fall into. Identifying which query belongs to which quick answer segment is not an easy problem to solve. A query has a one to many relationship with query results (one query produces many results), which can include more than one quick answer and/or more than one quick answer segment. Additionally, since queries can be phrased in numerous alternative ways all of which have the same meaning, simply matching language with quick answer segments is not always effective. In some embodiments one classifier is used and in some embodiments more than one classifier is used.

In a representative example, the machine learning model of classifier 206 can be trained to classify a query into one or more quick answer segments. In some embodiments, multiple classifiers 206 are used, each tailored to one or more quick answer segments. Numerous machine learning models can be effectively utilized in embodiments of the present disclosure. For example, Logistic Regression (LR), Naive-Bayes, Random Forest (RF), neural networks (NN) including deep neural networks (DNN), matrix factorization, and Support Vector Machines (SVM) tools may be used for predicting items and/or parameters associated therewith.

The machine learning model that predicts parameters can be trained by collecting data points comprising query-quick answer segment pairs. These data points can be collected as the search engine produces quick answers in a particular segment as queries are submitted. The machine learning models will learn those features of submitted queries that lead to quick answers in a particular quick answer segment.

If the quick answer segments change over time, updating the machine learning model parameters by either retraining the model with training data that reflects the quick answer segment changes or by adjusting the machine learning model parameters using updated training data.

The query database 208 is thus a database where queries associated with a segment can be retrieved. Although a single query database 208 is illustrated, multiple databases can be used if desired. Additionally, the query database 208 can use any type of data storage structure or format that allows the desired information to be retrieved as discussed herein.

When a current user query 210 is received by the search system 212, search results, including one or more quick answers 214 are received. The quick answer segment(s) 216 associated with each quick answer 214 can be identified from the search results themselves, and/or by submitting query 210 to an appropriate classifier (e.g., one or more of the classifiers 206).

Extraction process 218 looks up queries submitted by the user that submitted the current query 210. This is illustrated by extraction process 218 using a user ID 220 associated with the user to retrieve from the query database queries having a matching user ID 220. In this embodiment, the retrieved queries 222 represent queries that have been previously submitted by the user. In some embodiments, both the user ID 220 and quick answer segment 216 are used to identify the retrieved queries 122. In this embodiment, the retrieved queries 222 represent queries that have been previously submitted by the user and that share a common quick answer segment 216 with the current submitted query 210. The retrieved user queries are referred to as user queries 222.

Additionally, or alternatively, embodiments of the present disclosure can retrieve queries from the query database 208 from other users. These retrieved queries 224 are queries that can be used to expand the query suggestions beyond prior queries submitted by the user. Thus, queries from other users that have a quick answer segment that matches the quick answer segment 216 can be retrieved from query database 208 by extraction process 218. In an alternative embodiment, as explained below, queries by others that have one or more results that match the results of the current query 210 can be retrieved by extraction process 218 from query database 208. The resultant queries 224 are queries that have at least one common result with the current query 210. The common results can be quick answer results, non-quick answer results, or combinations thereof. The queries from other users are referred to herein as expanded queries 224.

The user queries 222 are put through a ranking and selection process 226 to yield a subset of user queries 230. The ranking and selection process can rank the user queries 222 according to one or more criteria. For example, user queries 222 can be ranked using one or more criteria that includes, but are not limited to:

Time: where queries that were submitted by the user more recently can be ranked higher or lower than queries submitted by the user less recently;

Frequency: where the rank can be proportional to the number of times that the user has submitted the same or a similar query, with more frequent submission of the query resulting in a higher rank;

Interaction with results: where queries that had results the user showed interaction and/or engagement with are ranked higher than queries that had results that the user didn't interact with;

Similarity: where queries that are more or less similar to the current query 210 are ranked higher or lower; and Any other single or multiple criteria.

After query ranking, a subset 230 can be selected based on any selection criteria. For example, the top N queries can be selected. Additionally, or alternatively, queries with rankings above/below a threshold can be selected. Additionally, or alternatively, a combination of the two such as the top N queries with a rank above/below a threshold value. Other selection criteria can also be used.

Expanded queries 224 can be put through a ranking and selection process 228 that can be the same as, or similar to the ranking and selection process 226 used for user queries 222. Additionally, or alternatively, the ranking and selection process 228 can select one or more expanded queries for the subset 232 on a random basis. In other words, randomly select a query from some or all of the expanded queries 224. Thus, expanded queries 224 can be ranked and selected based on any of the criteria above and/or on a random basis to yield the resultant subset 232.

User queries 230 and/or expanded queries 232 can be composited with one or more quick answers and placed in proximity to the same. This is performed by composition process 234 which creates the layout of the search results (not shown), quick answers (not shown), the query suggestions (e.g., user queries 230 and/or expanded queries 232), and/or other information to produce one or more results pages 236.

The system can monitor whether and how the user interacts with the presented query suggestions and the user interactions, and use this information as feedback 238 into a process that adjusts the ranking and/or selection process. For example, if the user doesn't interact with a user query from the subset 230 and/or an expanded query from the subset 232, the extraction process 218 and/or ranking and selection process 226, 228 can be adjusted so that the user query and/or expanded query will be less likely to be selected. This can be performed by marking the entry in the query database 208 so that it will not be extracted by the extraction process 218 (e.g., will not be part of expanded queries 224 and/or user queries 222), by adjusting the ranking and/or selection process so that such will not likely be selected, or a combination thereof.

Figure 3:
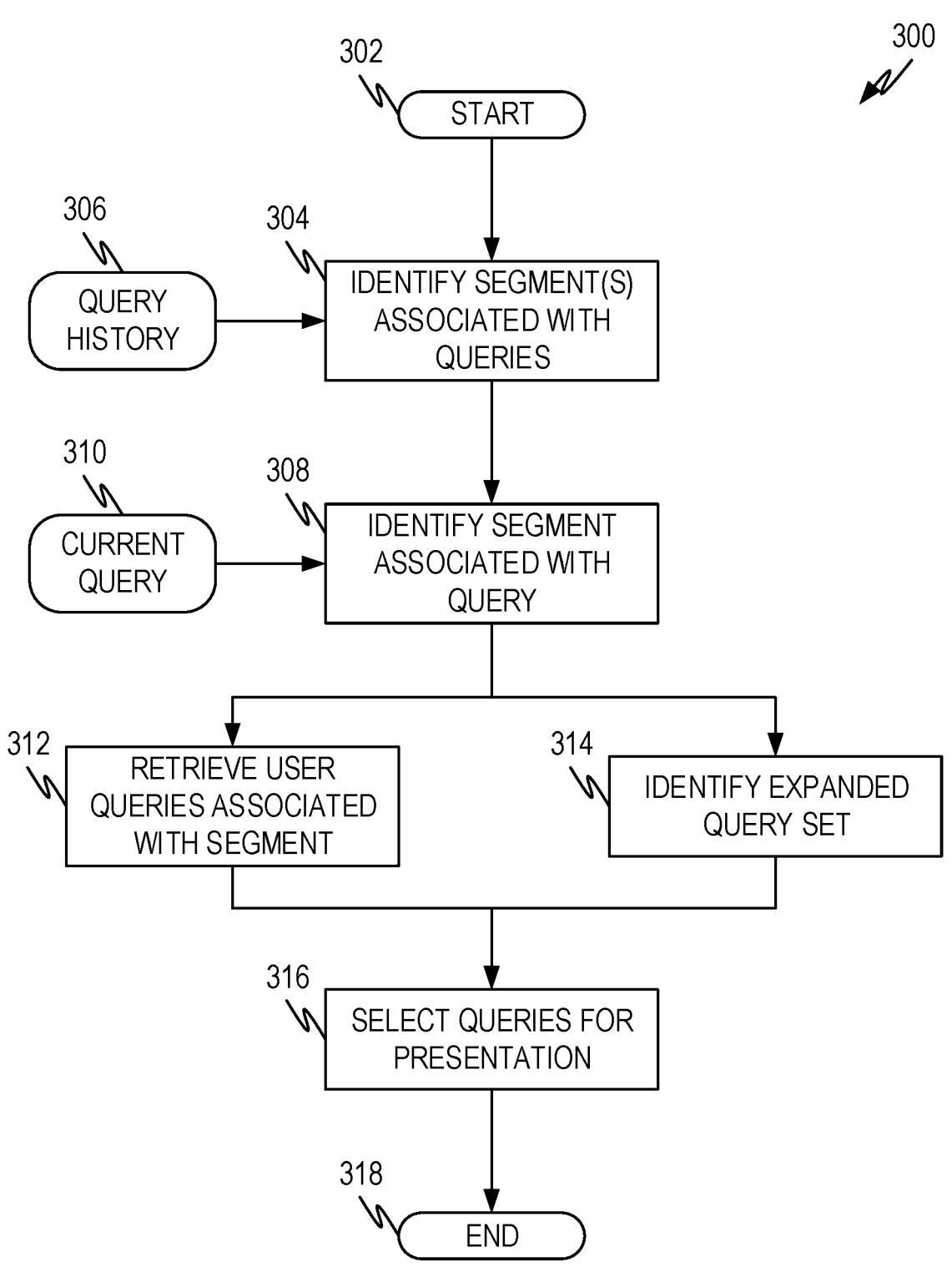
FIG. 3 illustrates an example flow diagram according to some aspects of the present disclosure.

FIG. 3 illustrates an example flow diagram 300 according to some aspects of the present disclosure. The flow diagram 300 shows an example of how the architecture of FIG. 2 can work, in part.

The process starts at operation 302 and proceeds to operation 304 which identifies quick answer segments associated with queries in a query history 306 as previously described. As discussed herein, this can be performed using one or more trained machine learning models. Operation 304 is an offline process as described, meaning it is performed prior to receiving the current user query. The results of the operation 304 can be stored in one or more query databases, as previously described.

Operation 308 identifies the quick answer segment(s) associated with the current query 310 that has been submitted by the user to the search system. As discussed this can be performed by evaluating the results to identify quick answer segments associated with quick answers in the search results. Additionally, or alternatively, a classifier employing a trained machine learning model can be utilized as discussed herein.

Operations 312 and 314 can both be performed, or only one or the other can be performed, depending on whether it is desired to present query suggestions that comprise prior queries from the user submitting the current query 310, expanded queries from other users, or both.

Operation 312 produces prior queries submitted by the user. Thus, operation retrieves prior user queries associated with the quick answer segment associated with the current query 310. The queries can be queries that produced quick answers, queries that did not produce quick answers, or any combination thereof. These can be retrieved using appropriate parameters from the one or more query databases as described herein.

Operation 314 produces queries from other users that are related to the current query. As described herein, that can be accomplished by retrieving queries from the one or more query databases that have associated quick answer segments matching the quick answer segment associated with the current query 310. Additionally, or alternatively, queries from other users that produce results that match the results (e.g., the same or similar results) produced by the current query can be retrieved.

The set of queries from operation 312 and/or the set of queries produced by operation 314 can be ranked and/or selected as described herein to produce a selected of query suggestions in operation 316. The query suggestions from operation 316 are presented in proximity to the quick answers associated with the current query 310.

The process ends at operation 318.

Figure 4:
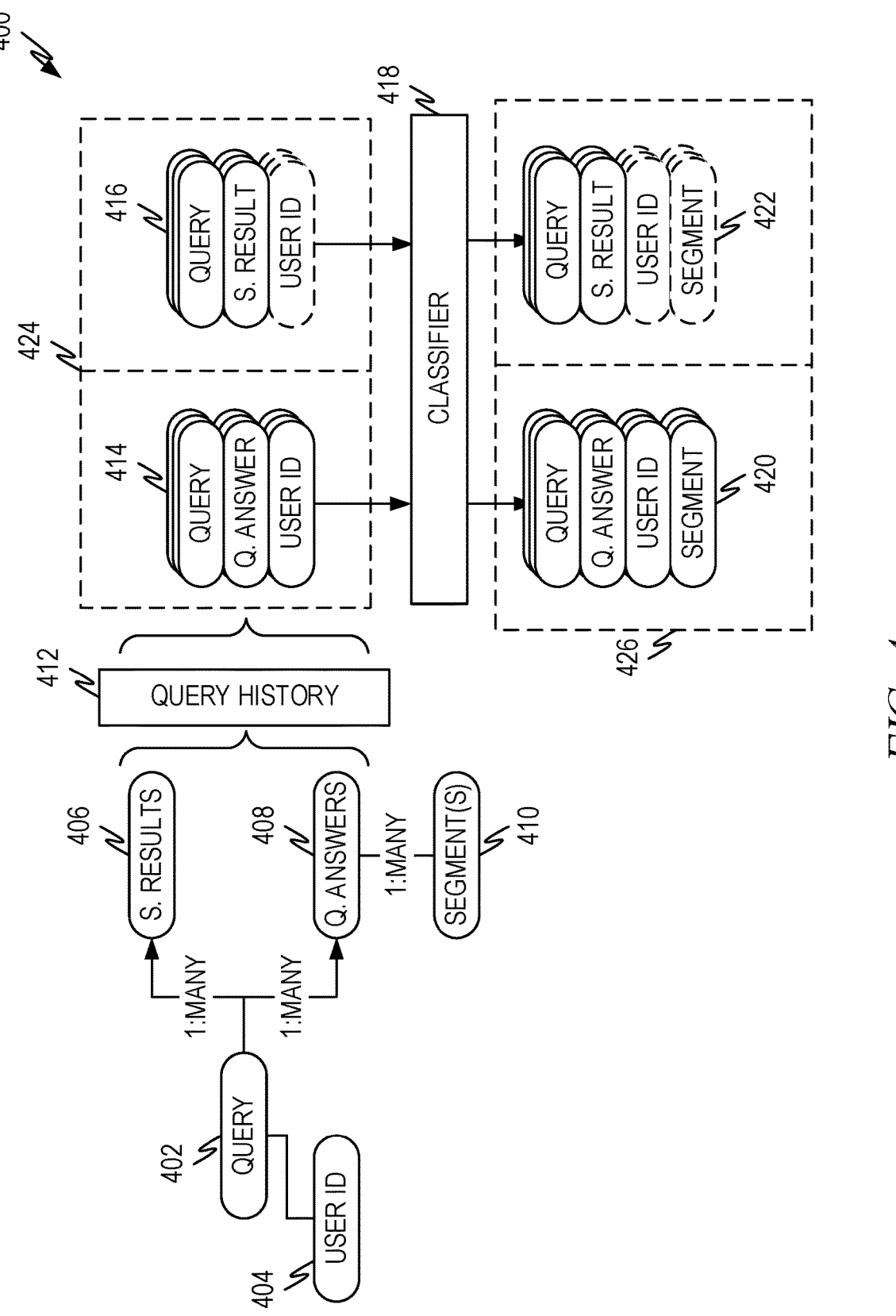
FIG. 4 illustrates an example diagram illustrating identification of segments associated with a query according to some aspects of the present disclosure.

FIG. 4 illustrates an example diagram 400 illustrating identification of quick answer segments associated with a query according to some aspects of the present disclosure. This diagram presents alternatives for the offline process that creates the one or more query databases (such as query database 208) in greater detail.

As discussed, identifying one or more quick answer segments associated with a query is not an easy problem to solve. A query 402, with an associated user ID 404 has the potential to produce a plurality of search results 406 and/or a plurality of quick answers 408. Each quick answer can have one or more associated quick answer segments 410. Add to that fact that two different queries can produce the same or similar search results, quick answers, and their associated quick answer segments, and the complexity of the problem grows.

Thus, in some embodiments, a query history process 412 collects a query history 424 that includes entries for quick answers and/or search results. For example, the query history 424 can comprise query-quick answer-user ID tuples, meaning each entry in the query history comprises a query, a quick answer produced by the query, and the user ID of the user that submitted the query. The query-query answer-user ID tuples 414 can be created for each combination thereof. Thus, a query submitted by a single user that produces three quick answers would give rise to three separate query-quick answer-user ID tuples 414.

Although not shown, if a query answer segment 410 is known, it can be added to the appropriate tuples. However, the collected query answer segments may not be of use should the query answer segments change so that an answer that was associated with one query answer segment in the past is now associated with a different query answer segment.

For search results 406 that are not quick answers 408, the query history can comprise query-search result-user ID tuples 416 meaning each entry for a search result comprises a query, a search result produced by the query, and a user ID. In some embodiments the user ID is optional. As before, an appropriate tuple is produced for each combination. Thus, a query submitted by a single user that produces five search results would give rise to five separate query-search result-user ID (if used) tuples 416.

As discussed herein, a search history 424 can comprise about 6 months of data in some embodiments, but a longer or shorter time period can be used.

One or more classifiers 418 comprising one or more trained machine learning models can be used to identify a quick answer segment associated with each entry in the query history 424. The machine learning models can be trained as described herein. The result can be a query database 426 where each entry for quick answers comprises a query, a quick answer produced by the query, a user ID, and a quick answer segment as shown 420.

Queries that are associated with search results (not quick answers) can also be classified using one or more appropriately trained classifiers 418 in some embodiments. Thus, the query-search result pairs and/or query-search result-user ID tuples can be coupled with the query answer segment 422 in some embodiments as shown by 422. These tuples can be stored in the query database 426. In other embodiments, an answer segment associated with a query-search result pair is identified using a different process. This alternative is discussed in greater detail below. In these embodiments, the query database entries for queries associated with search results can comprise query-search result pairs and/or query-search result-user ID tuples.

Figure 5:
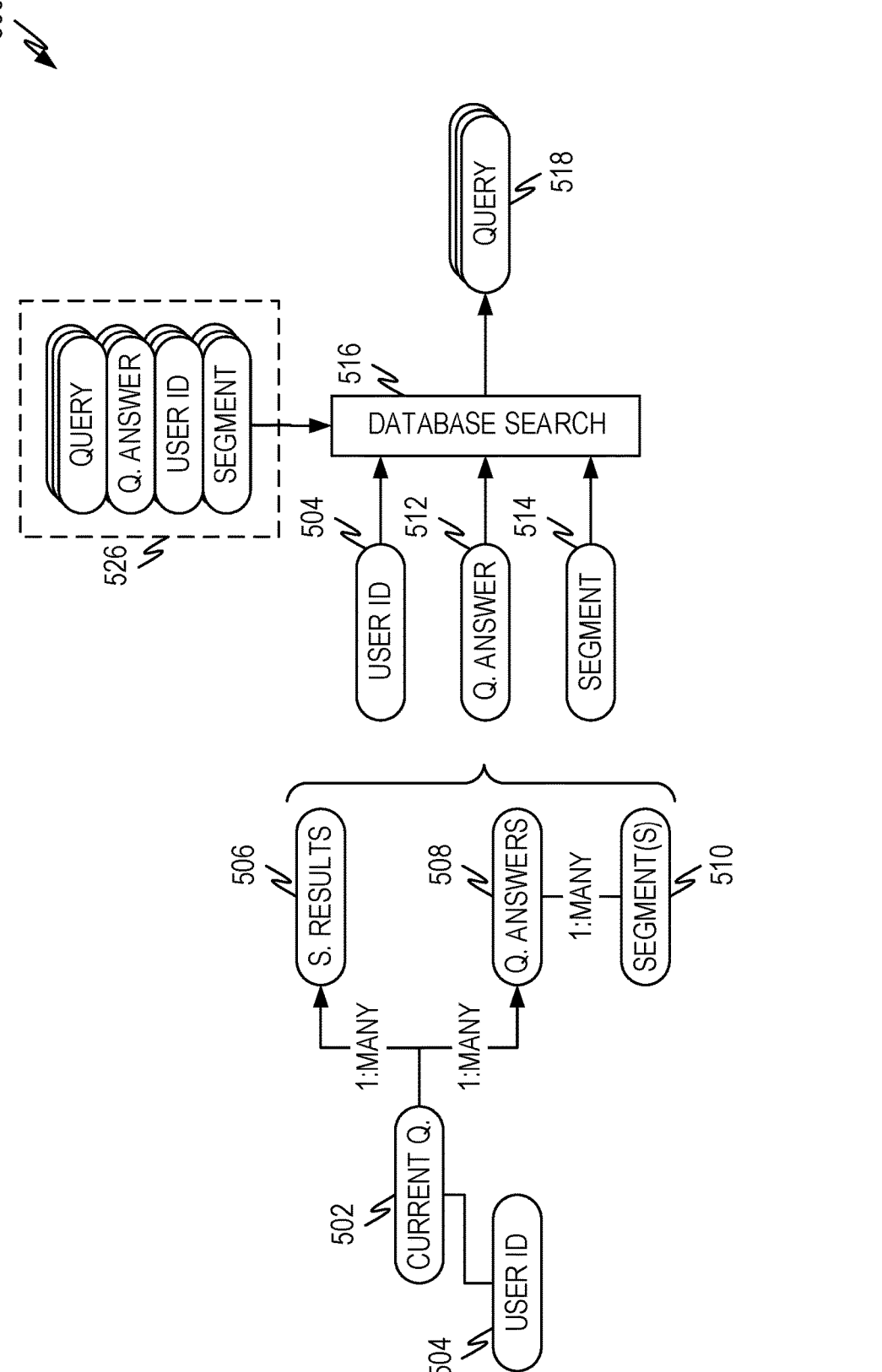
FIG. 5 illustrates an example diagram illustrating identification of queries associated with segments according to some aspects of the present disclosure.

FIG. 5 illustrates an example diagram 500 illustrating identification of queries associated with segments according to some aspects of the present disclosure. The diagram specifically shows an example of how prior user queries associated with the same quick answer segment can be identified (e.g., operation 312 of FIG. 3 and/or extraction process 218 and/or selection and ranking process 226 of FIG. 2).

A current user query 502 is received from a user associated with a user ID 504. As discussed herein, such a query can result in one or more search results 506 and/or one or more quick answers 508 with one or more associated quick answer segments 510. To extract prior queries that produced quick answers from the query database 526 (e.g., 208, 424), each combination of the user ID 504, a quick answer 512, and its associated segment 514 is used to search the query database 526. Specifically, quick answer 512 is a quick answer from the set of produced quick answers 508 and its associated quick answer segment 514 is a quick answer segment from the set of quick answer segments 510 associated with the selected quick answer 512.

Thus, a database search 516 is performed on the query database 526 to extract queries that have a user ID that matches user ID 504 and a segment that matches segment 514. In an alternative embodiment, if the query database has not classified the queries with associated segments, queries that have a user ID that matches (the same as or similar to) user ID 504 and a quick answer that matches quick answer 512.

The resultant queries 518 are the queries that are presented for further ranking and selection as described herein.

If the query database 526 comprises query-search result-User ID tuples (either with or without an associated quick answer segment), the same process can be used to extract queries that are not associated with a quick answer. For example, a user ID 504, search result (e.g., one of the set of search results 506) can be used to search the query database 526 and extract those queries 518 that have a search result that matches (e.g., is the same as or similar to) the search result from the set 506. If segments exist in the database, segment can also be a matching criteria in addition to or as an alternative to the search result.

Figure 6:
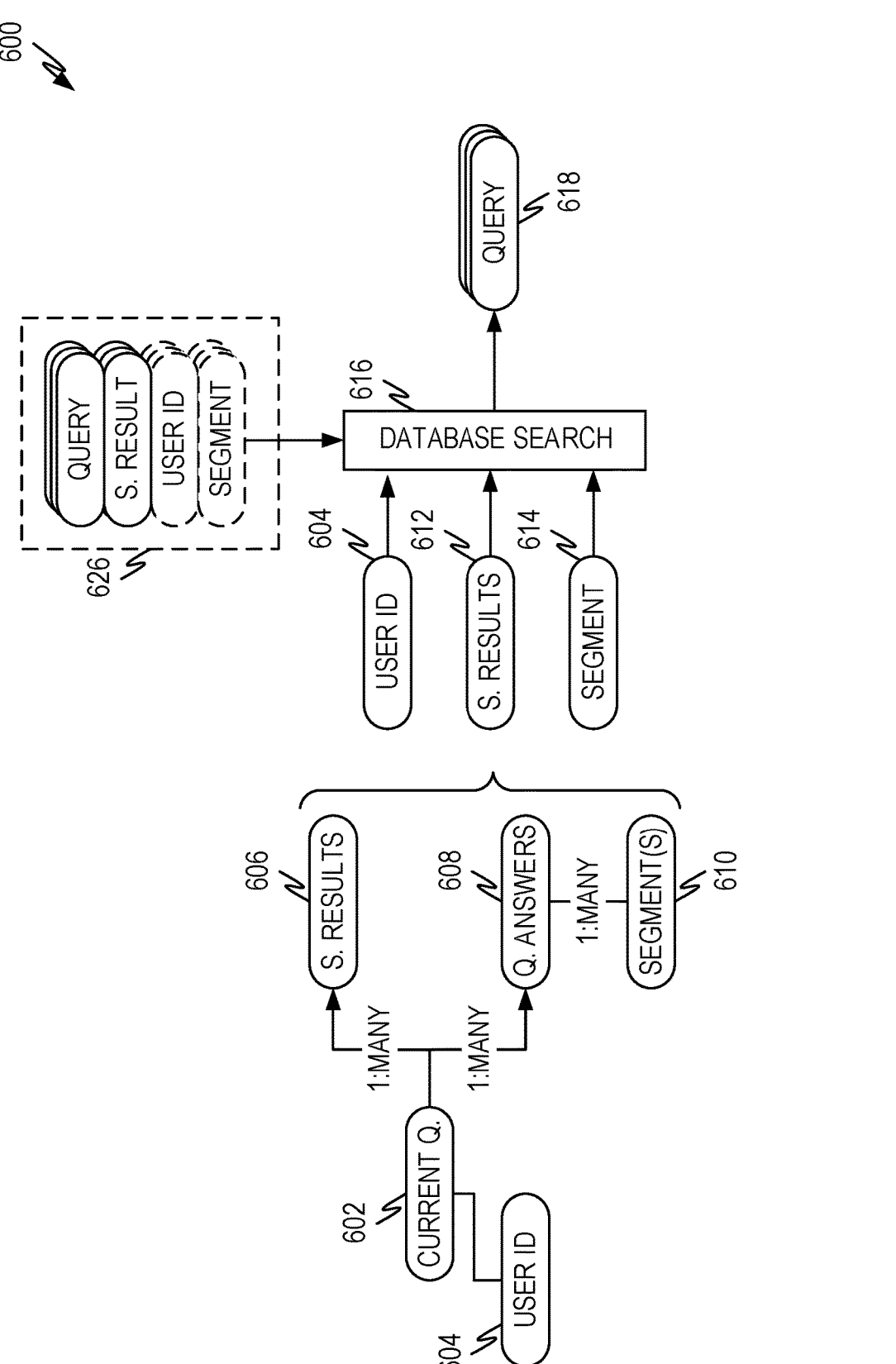
FIG. 6 illustrates an example diagram illustrating identification of queries associated with segments according to some aspects of the present disclosure.

FIG. 6 illustrates an example diagram 600 illustrating identification of queries associated with segments according to some aspects of the present disclosure. This diagram shows how queries can be extracted from the database without regard to the user ID or for other users other than the user that submitted the current query. The diagram specifically shows an example of how prior user queries associated with the same quick answer segment can be identified (e.g., operation 314 of FIG. 3 and/or extraction process 218 and/or selection and ranking process 228 of FIG. 2).

A current user query 602 is received from a user associated with a user ID 604. As discussed herein, such a query can result in one or more search results 606 and/or one or more quick answers 608 with one or more associated quick answer segments 610. To extract prior queries that are related to the current query 602 from a query database 626 (e.g., 208, 424), each combination of the user ID 604, and/or a search result 612, and/or and its associated segment 614 is used to search the query database 626. Specifically, search result 612 is a search result from the set of search results 606.

In a first aspect, the query database 626 does not comprise a segment and contains query-search result pairs, either with or without the user ID of the user that submitted the query. If it is desired to retrieve queries submitted by other users that are related to the segment 614, the queries 618 with a search result that matches search result 612 and with a user ID that does not match user ID 614 are extracted from the query database 626 using a database search 616. If it is desired to retrieve queries without regard to user ID, then the user ID 604 is not part of the search criteria.

If the entries in the query database 626 have an associated quick answer segment, then queries that are relevant to the current query 602 can be retrieved by selecting those queries 681 with a segment that matches segment 614 and user ID equal to, or not equal to, user ID 604, depending on whether queries submitted by the user or others are desired. If it is desired to retrieve queries without regard to user ID, then the user ID 604 is not part of the search criteria.

Segment 614 is known if segments 610 only contain a single segment. If segments 610 contain multiple segments, an appropriately trained machine learning model can classify a search result 612 into a quick answer segment and that segment can be used for segment 614.

Example Machine Architecture and Machine-Readable Medium

Figure 7:
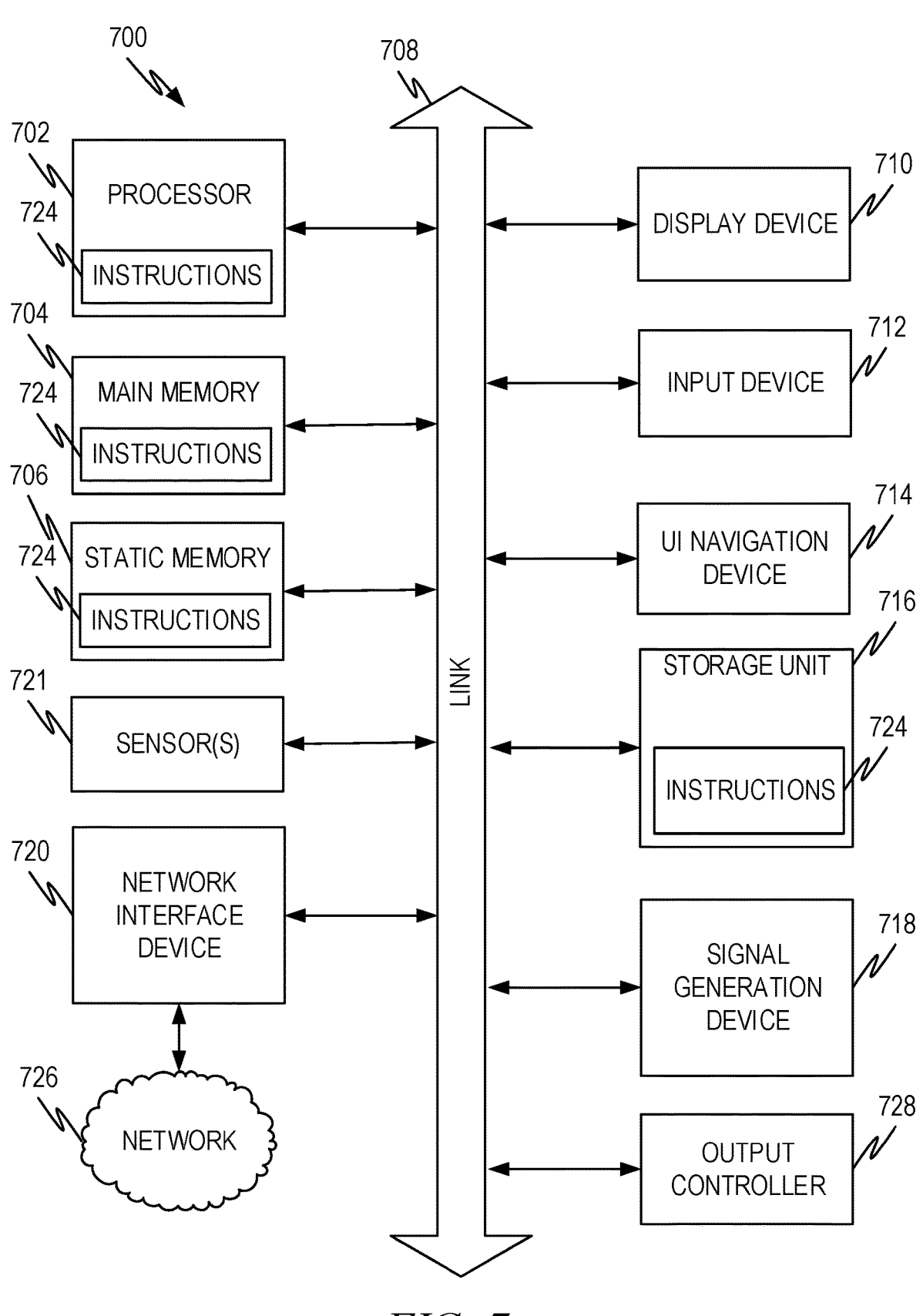
FIG. 7 illustrates a representative architecture for implementing the systems and other aspects disclosed herein or for executing the methods disclosed herein.

FIG. 7 illustrates a representative machine architecture suitable for implementing the systems and so forth or for executing the methods disclosed herein. The machine of FIG. 7 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 7 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), a graphics processing unit (GPU), advanced processing unit (APU), or combinations thereof), one or more memories such as a main memory 704, a static memory 706, or other types of memory, which communicate with each other via link 708. Link 708 may be a bus or other type of connection channel. The machine 70 may include further optional aspects such as a graphics display unit 710 comprising any type of display. The machine 700 may also include other optional aspects such as an alphanumeric input device 712 (e.g., a keyboard, touch screen, and so forth), a user interface (UI) navigation device 714 (e.g., a mouse, trackball, touch device, and so forth), a storage unit 716 (e.g., disk drive or other storage device(s)), a signal generation device 718 (e.g., a speaker), sensor(s) 721 (e.g., global positioning sensor, accelerometer(s), microphone(s), camera(s), and so forth), output controller 728 (e.g., wired or wireless connection to connect and/or communicate with one or more other devices such as a universal serial bus (USB), near field communication (NFC), infrared (IR), serial/parallel bus, etc.), and a network interface device 720 (e.g., wired and/or wireless) to connect to and/or communicate over one or more networks 726.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks: and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1 1. A method for showing personalized, comprising:

identifying a plurality of queries across at least one user group;

for each of the plurality of queries, identify at least on associated quick answer segment;

receiving a current query from a user;

identifying a current quick answer segment associated with the current query;

retrieving prior queries received from the user with an associated quick answer segment equal to the current quick answer segment;

selecting a subset of the prior queries received from the user; and presenting the subset proximate to a quick answer associated with the current query on a results page comprising results based on the current query.

Example 2. The method of claim 1 wherein the plurality of queries comprise queries received by all users over a designated time period.

Example 3. The method of claim 2 wherein the designated time period comprises about six months.

Example 4. The method of claim 1, 2, or 3 wherein identifying the at least one associated quick answer segment comprises:

accessing a machine learning model trained to classify a received query into a quick answer segment; and presenting a subset of the plurality of queries to the machine learning model to identify at least one quick answer segment associated with each query in the subset.

Example 5. The method of claim 1, 2, 3, or 4 wherein identifying at least one associated quick answer comprises:

for each if the plurality of queries, evaluating results received from a search system in response to submission of each of the plurality of queries to the search system.

Example 6. The method of claim 1, 2, 3, 4, or 5 wherein identifying the current quick answer segment comprises evaluating results received from a search system in response to submission of the current query to the search system.

Example 7. The method of claim 1, 2, 3, 4, 5, or 6 wherein identifying the plurality of queries across at least one user group comprises:

for each of the plurality of queries:

identifying a query quick answer in search results received by submission of a query of the plurality of queries to a search system;

creating a query record comprising the query, a userID of a user that submitted the query, and the query quick answer; and assembling the query records into a query history.

Example 8. The method of claim 7 further comprising:

for each query record in the query history:

submitting the query of the query record to a trained machine learning model and receiving in response a quick answer segment;

combining the quick answer segment with the query record to create an entry into a query database.

Example 9. The method of claim 8 wherein retrieving prior queries received from the user with an associated quick answer segment equal to the current quick answer segment comprises:

searching the query database and extracting therefrom queries with a userID associated with the user and a quick answer segment equal to the current quick answer segment.

Example 10. The method of claim 1, 2, 3, 4, 5, 6, 7, 8, or 9 further comprising:

retrieving prior queries received from other users that had at least one common search result with the current query;

select a subset of the prior queries from other users; and presenting the subset of the prior queries from other users proximate to the subset of the prior queries received from the user.

Example 11. The method of claim 1, 2, 3, 4, 5, 6, 7, 8, 9, or 10 wherein identifying the plurality of queries across at least one user group comprises:

for each of the plurality of queries:

identifying a query quick answer in search results received by submission of a query of the plurality of queries to a search system;

creating a query record comprising the query, a userID of a user that submitted the query, and the query quick answer; and assembling the query records into a query history;

for each query record in the query history:

submitting the query of the query record to a trained machine learning model and receiving in response a quick answer segment;

combining the quick answer segment with the query record to create an entry into a query database; and wherein retrieving prior queries received from the user with an associated quick answer segment equal to the current quick answer segment comprises:

searching the query database and extracting therefrom queries with a userID associated with the user and a quick answer segment equal to the current quick answer segment.

Example 12. The method of claim 1, 2, 3, 4, 5, 6, 7, 8, 9, 10, or 11 wherein the plurality of queries comprises queries received from a subset of users over a period of time.

Example 13. The method of claim 12 wherein the period of time comprises about six months.

Example 14. An apparatus comprising means to perform a method as in any preceding claim.

Example 15. Machine-readable storage including machine-readable instructions, when executed, to implement a method or realize an apparatus as in any preceding claim.

Example 16. A method for showing personalized, comprising:

identifying a plurality of queries across at least one user group;

for each of the plurality of queries, identify at least on associated quick answer segment;

receiving a current query from a user;

identifying a current quick answer segment associated with the current query;

retrieving prior queries received from the user with an associated quick answer segment equal to the current quick answer segment:

selecting a subset of the prior queries received from the user; and presenting the subset proximate to a quick answer associated with the current query on a results page comprising results based on the current query.

Example 17. The method of claim 16 wherein the plurality of queries comprise queries received by all users over a designated time period.

Example 18. The method of claim 17 wherein the designated time period comprises about six months.

Example 19. The method of claim 16 wherein identifying the at least one associated quick answer segment comprises:

accessing a machine learning model trained to classify a received query into a quick answer segment; and presenting a subset of the plurality of queries to the machine learning model to identify at least one quick answer segment associated with each query in the subset.

Example 20. The method of claim 16 wherein identifying at least one associated quick answer comprises:

for each if the plurality of queries, evaluating results received from a search system in response to submission of each of the plurality of queries to the search system.

Example 21. The method of claim 16 wherein identifying the current quick answer segment comprises evaluating results received from a search system in response to submission of the current query to the search system.

Example 22. The method of claim 16 wherein identifying the plurality of queries across at least one user group comprises:

for each of the plurality of queries:

identifying a query quick answer in search results received by submission of a query of the plurality of queries to a search system;

creating a query record comprising the query, a userID of a user that submitted the query, and the query quick answer; and assembling the query records into a query history.

Example 23. The method of claim 22 further comprising:

for each query record in the query history:

submitting the query of the query record to a trained machine learning model and receiving in response a quick answer segment;

combining the quick answer segment with the query record to create an entry into a query database.

Example 24. The method of claim 23 wherein retrieving prior queries received from the user with an associated quick answer segment equal to the current quick answer segment comprises:

searching the query database and extracting therefrom queries with a userID associated with the user and a quick answer segment equal to the current quick answer segment.

Example 25. The method of claim 16 further comprising:

retrieving prior queries received from other users that had at least one common search result with the current query;

select a subset of the prior queries from other users: and presenting the subset of the prior queries from other users proximate to the subset of the prior queries received from the user.

Example 26. A system comprising a processor and computer executable instructions, that when executed by the processor, cause the system to perform operations comprising:

identifying a plurality of queries across at least one user group;

for each of the plurality of queries, identify at least on associated quick answer segment;

receiving a current query from a user;

identifying a current quick answer segment associated with the current query;

retrieving prior queries received from the user with an associated quick answer segment equal to the current quick answer segment:

selecting a subset of the prior queries received from the user; and presenting the subset proximate to a quick answer associated with the current query on a results page comprising results based on the current query.

Example 27. The system of claim 26 wherein the plurality of queries comprise queries received by all users over a designated time period.

Example 28. The system of claim 27 wherein the designated time period comprises about six months.

Example 29. The system of claim 26 wherein identifying the at least one associated quick answer segment comprises:

accessing a machine learning model trained to classify a received query into a quick answer segment; and presenting a subset of the plurality of queries to the machine learning model to identify at least one quick answer segment associated with each query in the subset.

Example 30. The system of claim 26 wherein identifying at least one associated quick answer comprises:

for each if the plurality of queries, evaluating results received from a search system in response to submission of each of the plurality of queries to the search system.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for providing a query suggestion, the method comprising:

receiving, at a computer-implemented search engine, a query from a user;

upon receiving the query:

searching an index with the query to identify search results for the query; and identifying a quick answer for the query, wherein the quick answer is to be presented concurrently on a search engine results page with links to the search results, and further wherein a quick answer segment is assigned to the quick answer;

subsequent to identifying the quick answer for the query, identifying a prior query previously received from the user, wherein the prior query also has the quick answer segment assigned thereto, and further wherein the prior query is identified based upon the quick answer segment assigned to the identified quick answer for the query matching the quick answer segment assigned to the prior query; and causing the search engine results page to be presented to the user, the search engine results page comprising:
the links to the search results that were identified based on the query;
the quick answer for the query; and
the prior query as a query suggestion for the user, wherein the query suggestion is presented to visually indicate to the user that the quick answer segment is assigned to both the query suggestion and the quick answer.

2. The method of claim 1, wherein the quick answer segment is one of health, politics, news, finance, sports, or esports.

3. The method of claim 1, further comprising:
identifying a second prior query previously received from a second user, wherein the second prior query is identified based upon the quick answer segment assigned to the identified quick answer for the query matching the quick answer segment assigned to the second prior query, and further wherein the search engine results page includes the second prior query as a second query suggestion for the user.

4. The method of claim 1, further comprising identifying the quick answer segment based upon the query, wherein identifying the quick answer segment based upon the query comprises:
accessing a machine learning model trained to classify a received query into a quick answer segment, wherein the quick answer segment is assigned to the query by the machine learning model.

5. The method of claim 1 wherein identifying the prior query comprises:
identifying several prior queries that have the quick answer segment assigned thereto, the prior queries previously submitted by the user; and
ranking the prior queries based on a selection criteria, wherein a most highly ranked prior query in the prior queries is selected as the identified prior query.

6. The method of claim 1 wherein the search engine results page further includes a second quick answer that is assigned to the query suggestion.

7. The method of claim 1, further comprising:
receiving a selection of the query suggestion; and
based upon the query suggestion being selected, updating a weight that is assigned to the query suggestion to increase a likelihood that the query suggestion will be presented to the user upon the user issuing another query.

8. The method of claim 1, further comprising:
acquiring queries submitted by various users within a designated period of time; and
providing the acquired queries to a machine learning classifier, wherein the machine learning classifier is configured to output an indication as to whether each query in the acquired queries is to have the quick answer segment assigned thereto.

9. The method of claim 1, further comprising identifying the quick answer segment for the query based upon the search results.

10. A computing system comprising:
a processor; and
memory storing instructions that, when executed by the processor, cause the processor to perform acts comprising:
receiving, at a computer-implemented search engine executing on the computing system, a query from a user;

upon receiving the query:
searching an index with the query to identify search results for the query; and
identifying a quick answer for the query, wherein the quick answer for the query is to be presented on a search engine results page concurrently with links to the search results, and further wherein a quick answer segment is assigned to the quick answer;
subsequent to identifying the quick answer for the query, identifying a prior query previously submitted to the search engine, wherein the prior query also has the quick answer segment assigned thereto, and further wherein the prior query is identified based upon the quick answer segment assigned to the identified quick answer for the query matching the quick answer segment assigned to the prior query; and
causing the search engine results page to be presented to the user, the search engine results page comprising:
the links to the search results that were identified based on the query;
the quick answer for the query; and
the prior query as a query suggestion, wherein the query suggestion is presented to visually indicate to the user that the quick answer segment is assigned to both the query suggestion and the quick answer.

11. The computing system of claim 10, wherein the quick answer segment is one of health, politics, news, finance, sports, or esports.

12. The computing system of claim 10, the acts further comprising:
identifying a second prior query previously received from a second user, wherein the second prior query is identified based upon the quick answer segment assigned to the identified quick answer for the query matching the quick answer segment assigned to the second prior query, and further wherein the search engine results page includes the second prior query as a second query suggestion for the user.

13. The computing system of claim 10, the acts further comprising identifying the quick answer segment based upon the query, wherein identifying the quick answer segment based upon the query comprises:
accessing a machine learning model trained to classify a received query into a quick answer segment, wherein the quick answer segment is assigned to the query by the machine learning model.

14. The computing system of claim 10, wherein identifying the prior query comprises:
identifying several prior queries that have the quick answer segment assigned thereto, the prior queries previously submitted by the user; and
ranking the prior queries based on a selection criteria, wherein a most highly ranked prior query in the previously submitted queries is selected as the query suggestion.

15. The computing system of claim 10, wherein the search engine results page further includes a second quick answer that is assigned to the query suggestion.

16. A computer storage medium comprising executable instructions that, when executed by a processor of a machine, cause the machine to perform operations comprising:

receiving, at a computer-implemented search engine executing on a computing system, a query from a user; upon receiving the query:

searching an index with the query to identify search results for the query; and identifying a quick answer for the query, wherein the query answer for the query is to be presented on a search engine results page concurrently with links to the search results, and further wherein a quick answer segment is assigned to the quick answer;

subsequent to identifying the quick answer for the query, identifying a prior query previously received from the user, wherein the prior query has the quick answer segment assigned thereto, and further wherein the prior query is identified based upon the quick answer segment assigned to the identified quick answer for the query matching the quick answer segment assigned to the prior query; and causing the search engine results page to be presented to the user, the search engine results page comprising:

the links to the search results that were identified based on the query;

the quick answer for the query; and the prior query as a selectable query suggestion for the user, wherein the selectable query suggestion is presented to visually indicate to the user that the quick answer segment is assigned to bot the query suggestion and the quick answer.

17. The computer storage medium of claim 16, wherein the quick answer segment is one of health, politics, news, finance, sports, or esports.

18. The computer storage medium of claim 16, the operations further comprising:

identifying a second prior query previously received from a second user, wherein the second prior query is identified based upon the quick answer segment assigned to the identified quick answer for the query matching the quick answer segment assigned to the second prior query, and further wherein the search engine results page includes the second prior query as a second query suggestion for the user.

19. The computer storage medium of claim 16, the operations further comprising identifying the quick answer segment based upon the query, wherein identifying the quick answer segment based upon the query comprises:

accessing a machine learning model trained to classify a received query into a quick answer segment, wherein the quick answer segment is assigned to the query by the machine learning model.

20. The computer storage medium of claim 16, wherein identifying the prior query comprises:

identifying several prior queries that have the quick answer segment assigned thereto, the prior queries previously submitted by the user; and ranking the prior queries based on a selection criteria, wherein a most highly ranked prior query in the prior queries is selected as the identified prior query.

\*   \*   \*   \*   \*